United States Patent
Rubio Andres et al.

(10) Patent No.: US 8,103,237 B2
(45) Date of Patent: Jan. 24, 2012

(54) METHOD OF COMMUNICATION BETWEEN A SOURCE MOBILE SET WITHOUT NETWORK COVERAGE AND A TARGET SET

(75) Inventors: Francisco Javier Rubio Andres, Madrid (ES); Lucia Garate Mutiloa, Madrid (ES); Francisco José Marin Garcia, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 318 days.

(21) Appl. No.: 12/521,548

(22) PCT Filed: Dec. 28, 2007

(86) PCT No.: PCT/ES2007/000773
§ 371 (c)(1),
(2), (4) Date: Jun. 26, 2009

(87) PCT Pub. No.: WO2008/081063
PCT Pub. Date: Jul. 10, 2008

(65) Prior Publication Data
US 2010/0317342 A1    Dec. 16, 2010

(30) Foreign Application Priority Data
Dec. 28, 2006 (ES) .................................. 200603296

(51) Int. Cl.
*H04W 48/16* (2009.01)

(52) U.S. Cl. .................... 455/343; 455/445; 370/237
(58) Field of Classification Search ....... 455/414.1–421, 455/426.1–426.2, 434, 458–465; 370/338–360
See application file for complete search history.

(56) References Cited

U.S. PATENT DOCUMENTS

| | | | |
|---|---|---|---|
| 6,745,225 B2 | 6/2004 | Loh et al. | |
| 7,394,798 B2* | 7/2008 | Naghian | 370/338 |
| 2003/0235175 A1 | 12/2003 | Naghian et al. | |
| 2005/0152318 A1 | 7/2005 | Elbatt et al. | |
| 2006/0002328 A1 | 1/2006 | Naghian et al. | |
| 2008/0056215 A1* | 3/2008 | Kopikare et al. | 370/338 |

* cited by examiner

*Primary Examiner* — Kent Chang
*Assistant Examiner* — Keith Fang
(74) *Attorney, Agent, or Firm* — Workman Nydegger

(57) ABSTRACT

A communication procedure between a source mobile equipment which at a given time has no mobile network coverage, and a target equipment, comprising: establishing communication between the source mobile equipment and the target equipment in stages via intermediary equipment; the source equipment initiating a search of the intermediary equipment for sending a message to the target equipment; if the search process does not result in a first intermediary, the source equipment initiates the search process again; the intermediary equipment receive the message and if none of them is the target, those having a retransmitter profile initiate a search process for second intermediary equipment for sending said the message, until the message is received by the target equipment.

6 Claims, 1 Drawing Sheet

METHOD OF COMMUNICATION BETWEEN A SOURCE MOBILE SET WITHOUT NETWORK COVERAGE AND A TARGET SET

OBJECT OF THE INVENTION

The present invention relates to an offline communication system between two equipments which at a given time may not be connected, and nevertheless, communication is established in stages between said terminals during a time interval.

BACKGROUND OF THE INVENTION

Current communications are normally based on the situation of the most advanced countries where a sufficiently uniform and wide coverage so as to be able to count on terminal-network communication always being guaranteed is assumed. But there are some cases where this does not occur and there is nothing to solve it.

One of them is that of emergent countries where there is only coverage in specific more or less extensive points depending on the economy of the area; in certain cases it is not cost-effective to provide coverage and users are therefore lost as clients.

Another group that is not covered is that of those devices having communication interfaces with the idea of communicating peer-to-peer or in very localized places; this is the case, for example, of certain devices provided with WLAN (consoles and PDAs) and of bluetooth terminals having interfaces for close communications and connection with other devices.

For that reason, this type of device could not be used, for example, in a peer-to-peer network, which is no more than communication between devices using a common reference which is a file or application, but where there is always instantaneous communication between all the users who are sharing that file or application.

The use of this type of device is then underused; nevertheless, the process of the present invention is not only limited to the type of device indicated above, but rather—as will be demonstrated below, once the invention has been described—, is applicable without problems to any radio interface.

By way of example patent application US-A-2005/05262207 can be mentioned, which implements a method to ensure offline messages even when one of the terminals is offline, making a replica of security data.

In U.S. Pat. No. 6,745,225-B2 a method is described to allow communication between two user processes in a communications management system, regardless of the availability of said user processes.

It is known that in the field of telecommunications terms in English are often used; a glossary of the terms that are used throughout the present descriptive report is provided below:

| | |
|---|---|
| PDA | Personal Digital Assistant |
| WLAN | Wireless Local Area Network |

DESCRIPTION OF THE INVENTION

The invention relates to a communication procedure between a source mobile equipment which at a given time has no mobile network coverage, and a target equipment according to claim 1. Preferred embodiments of the procedure are described in dependent claims.

The present invention resolves the posed technical problem of communication between two equipments, source and target, one of which is offline, the communication path between said equipments therefore not being known, by means of the procedure defined in claim 1.

The procedure of the present invention thus allows communication between a source mobile equipment and a target equipment which at a given instant are not connected and the communication path of which is not known a priori; but with this procedure such communication path is available in stages during a time interval.

A first aspect of the invention relates to a communication procedure between a source mobile equipment which at a given time has no mobile network coverage, and a target equipment,
the procedure comprises:
establishing said communication between source mobile equipment and target equipment in stages through one or more intermediary equipments, for which purpose the procedure comprises:
assigning a retransmitter or non-retransmitter profile to each one of said one or more intermediary equipments;
the source equipment initiating a search process for at least one intermediary equipment which is within a first range of coverage defined by radio technology communication means of said source equipment in order to send a message containing at least one identifier of the target equipment, one identifier of the source equipment and a content for the target equipment, assigning to said message a first expiry time T1, and i) if said search process results in at least a first intermediary equipment within the first range of coverage within said first expiry time T1, the source equipment sends to said at least one first detected intermediary equipment a message, said message being sent through radio technology communication means of said source equipment;

ii) if said search process does not result in at least one first intermediary equipment within said first expiry time T1, the source equipment initiates the search process again;

said first intermediary equipment receives said message and if said intermediary equipment is not the target equipment but has retransmitter profile, it initiates a search process for at least one second intermediary equipment which is within a second range of coverage defined by radio technology communication means of said first intermediary equipment with retransmitter profile to send said message, assigning to said message a second expiry time T2, and i) if said search process results in at least one second intermediary equipment within the second range of coverage within said second expiry time T2, the first intermediary equipment with retransmitter profile sends the message to said detected second intermediary equipment with at least the identifier of the target equipment, the identifier of the source equipment and the content for the target equipment;

ii) if said search process does not result in at least one second intermediary equipment within said time T2, the first intermediary equipment with retransmitter profile initiates the search process again;

until said message is received by the target equipment.

In other words, according to the procedure of the invention, even if there is no instantaneous communication between source and target equipments, nor is the communication path between said source and target equipments known with certainty, the communication is finished since it is carried out in hops or stages. In fact, the source mobile equipment sends the message to all the "neighbour" (within its range) nodes/equipments with which it has communication or intermediary equipments; of these intermediary equipments some do not retransmit and others do, depending on whether they have assigned a non-retransmitter or retransmitter profile, respectively It is also possible that the mobile equipment reviews the profile of the following node to see if it has retransmitter or non-retransmitter profile; and similarly with the intermediary equipments with retransmitter profile, in other words, they are going to retransmit or emit the message to the following neighbour nodes, which review the profile of the following node before sending the message to see if it has retransmitter or non-retransmitter profile.

Furthermore, in addition, as a retransmitter or non-retransmitter profile has been assigned to the different intermediary equipments, a flood of messages is prevented, since they do not retransmit the message to those "non-retransmitter" equipments or nodes.

The case may also arise that some of the intermediary equipments have mobile telephony network coverage; in such a case, the corresponding intermediary equipment can send the message directly to the network so that the network forwards it to the target equipment.

Preferably said retransmitter or non-retransmitter profile which is assigned to each intermediary equipment is variable; such that an intermediary equipment can retransmit more or fewer messages depending on the profile it has at each moment, if it is a retransmitter or non-retransmitter. This profile preferably depends on implementation variables or on the capacities of the intermediary equipment at each moment.

Examples of local implementation variables which can influence the profile of each retransmitter equipment can be, for example, that the message is or is not retransmitted depending on the battery in the mobile terminal; thus a good retransmitter equipment could change its profile if it carries out many retransmissions in a determined time. Another possibility is that a determined node has contact with many equipments for a short period of time, whereby it would be considered a priority retransmitter.

In relation with the intermediary or retransmitter equipment, each user of the the mobile terminal can have his/her profile or character defined as "retransmitter user" in different ways; for example:
a) The mobile terminal can be configured to always retransmit, and includes a counter which rises every time a message is retransmitted; when the counter reaches a value of 10 (for example) its stops retransmitting. The counter can be configured, for example, to reset itself when the battery is charged.
b) The user of the mobile terminal can have a contract with his/her mobile telephony operator in which he/she is charged per retransmission (or per number X of retransmissions), and the profile then is that it always retransmits because the software of said terminal is marked with that feature.
c) The mobile terminal can be configured to retransmit only certain packages marked as priorities.

The advantage of the present invention compared to the existing networks is that in the existing networks the communication is not initiated until it is verified that the target exists; which does not occur in the present case, since the communication is initiated even though neither the location nor the way of getting to the target is known with certainty, in other words, without confirming the target with any intermediary network. Nevertheless, in the process of the invention it can be contemplated that methods are defined for notifying (or confirming) the source equipment that the message is not (or is) delivered to its target.

DESCRIPTION OF THE DRAWINGS

To complement the description which is being carried out and with and with the object of aiding to better understanding the features of the invention according to a preferred practical embodiment thereof, a set of drawings with an illustrative and non-limiting character is attached as an integral part of said description, in which the following has been depicted.

PREFERRED EMBODIMENT OF THE INVENTION

Figure 1:
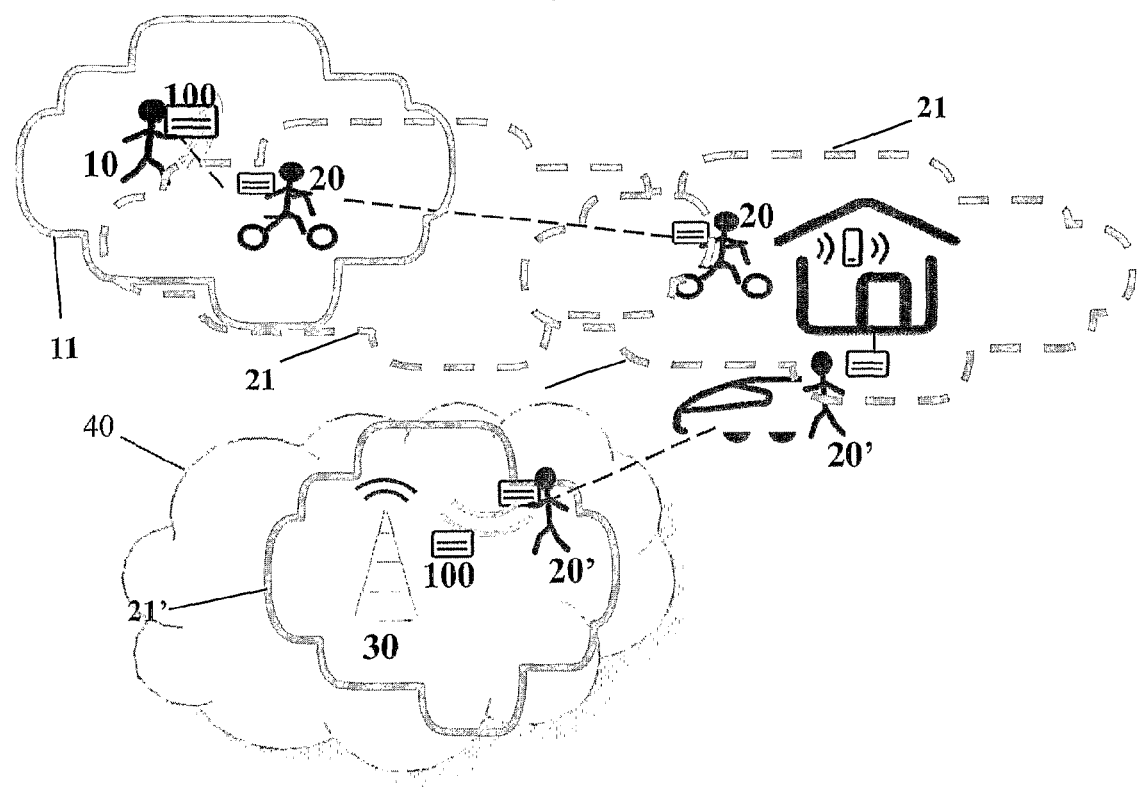
FIG. 1 depicts a possible example of the application of the present invention.

A possible example of the application of the procedure of the invention is the following: a worker 10 (emitter user) in a rice plantation, who wants to know the daily price of rice, and who has no coverage. The worker 10 sends a message 100 including the request for the price of rice with his/her device, for example, via wireless LAN; when a neighbour 11 (retransmitter user) who, for example, returns on a bicycle to his/her house enters the range of communication 11 of the worker, this neighbour receives the request and since he/she has retransmitter profile, he/she retransmits it; similarly, when another person 20' (intermediary user) enters the range 21 of the neighbour, he/she receives the request and since he/she is not the target equipment and has retransmitter profile, he/she repeats the previous operation; or the same thing happens if on the road he/she passes a motorway and finds somebody in range in a car or a train.

This way there is always an intermediary user with retransmitter profile who gets to a point where there is coverage and the message 100 with the request gets to the network 30 (target), which in this example passes it to the corresponding price quoting service. Once the request is received, the network sends daily message to the worker with the information requested in the request by using a similar procedure until it receives cancellation of the service.

In the event that the target equipment is not the network but rather, for example, another mobile equipment, the procedure would be similar: the message goes in stages from the source, through one or more intermediary equipments with retransmitter profile, until it gets to the target equipment (without necessarily passing through the network).

As far as sending the information is concerned, in the example just described, the mobile equipment of the worker sends the request to all the surrounding nodes or mobile equipments, and later the intelligence of each node is what decides to retransmit or not. Determining those surrounding equipments can be done, for example, by means of the network recognition function of the nodes, in periods of time T, carry out a "hello" and the other nodes will respond to that hello such that the list of vicinities can be updated. This time T is a compromise between battery duration and network variation.

It may also occur that it begins by communicating with the surrounding nodes which it considers have more possibilities of finding the path.

These surrounding nodes or mobile equipments have different profiles assigned, such that nodes retransmit more or fewer messages depending on their profile; this profile which is assigned to each node is variable depending on the circumstances.

It is not necessary for the source equipment to know the profile of the surrounding nodes; it is only necessary that it knows that such nodes are there, and that it can communicate with them. In other words, the source equipment sends the message to all the nodes/equipments with which it has communication or intermediary equipments; of these intermediary equipments, there will be some that do not retransmit and some that do. The node in itself can be a specific retransmission terminal located in an installation and with a connection to electric light or external retransmitter, such as for example a terminal located in a train or a large shop, and which has access to many mobile nodes, making it a priority retransmitter.

There are many examples; the important thing is that the profile of each node is variable, and that it has intelligence based on its local conditions which affect and allow communication throughout the entire network. Therefore, the system of the present invention is not a simple local automation, since that would not provide an overall intelligence to the system.

This intermediary equipment with retransmitter profile (which serves to transport the information) does not need to carry out any action on the message, since this communication is totally transparent for it. This has the advantage that in being an automatic process, the intermediary equipment puts the message in send mode or in search of intermediary equipments (or in the "outbox"), and will be able to exit when it is possible, without the user having to intervene.

In other words, the emitter only needs to know the target, not the route; for its part, the intermediary may or may not be located at the terminal or target equipment, but it knows that it can retransmit that information to other nodes. Thus, in the illustrated example, the mobile equipment of the worker searches in his vicinity for existing communication possibilities and sends the message to all the nodes/equipments that it finds. There is no flooding because in a second step not all of these nodes retransmit.

These different possibilities of practical embodiments of the invention are described in dependent claims.

In view of this description and of the attached figure, the person skilled in the art will be able to understand that the embodiments of the invention which have been described can be combined in many ways within the object of the invention. The invention has been described according to some preferred embodiments thereof, but for the person skilled in the art it will be evident that many variations can be introduced into said preferred embodiments without exceeding the object of the claimed invention.

The invention claimed is:

1. Communication procedure between a source mobile equipment which at a given time does not have mobile telephone network coverage, and a target equipment, the procedure comprises:
   establishing said communication between source mobile equipment and target equipment in stages through one or more intermediary equipments, for which purpose the procedure comprises:
   assigning a retransmitter or non-retransmitter profile to each one of said one or more intermediary equipments;
   the source equipment initiating a search process for intermediary equipments which are within a first range of coverage defined by radio technology communication means of said source equipment to send a message containing at least one identifier of the target equipment, one identifier of the source equipment and a content for the target equipment, assigning to said message a first expiry time T1, and
   i) if said search process results in one or more first intermediary equipments within the first range of coverage within said first expiry time T1, the source equipment sends to said first detected intermediary equipments a message through radio technology communication means of said source equipment;
   ii) if said search process does not result in at least one first intermediary equipment within said first expiry time T1, the source equipment initiates the search process again;
   said first intermediary equipments receive said message and if none of these intermediary equipments is the target equipment, that or those first intermediary equipments having retransmitter profile, initiates a search process for one or more second intermediary equipments which are within a second range of coverage defined by radio technology communication means of said first intermediary equipment with retransmitter profile to send said message, assigning to said message a second expiry time T2, and
   i) if said search process results in at least one second intermediary equipment within the second range of coverage within said second expiry time T2, the first intermediary equipment with retransmitter profile sends the message to said detected intermediary equipment with at least the identifier of the target equipment, the identifier of the source equipment and the content for the target equipment;
   ii) if said search process does not result in at least one second intermediary equipment within said second expiry time T2, the first intermediary equipment with retransmitter profile initiates the search process again;
   until said message is received by the target equipment.

2. Procedure according to claim 1, wherein the source mobile equipment or one of the intermediary equipments, before sending said message to said intermediary equipments, verifies that said intermediary equipments have retransmitter profile.

3. Procedure according to claim 1, wherein said retransmitter or non-retransmitter profile which is assigned to each intermediary equipment is variable.

4. Procedure according to claim 3, wherein said variable profile depends on local implementation variables of said intermediary equipment.

5. Procedure according to claim 1, wherein if the intermediary equipment has mobile telephony network coverage, the intermediary equipment sends the message to the network so that the network forwards it to the target equipment.

6. Procedure according to claim 1, wherein said source equipment sends the message to an external retransmitter equipment.

* * * * *